United States Patent
Qiu

(10) Patent No.: US 9,179,644 B2
(45) Date of Patent: Nov. 10, 2015

(54) COMBINED DISH RACK

(71) Applicant: JIANGSU ZHONGHENG PET ARTICLES JOINT-STOCK CO., LTD, Jiangsu (CN)

(72) Inventor: Bin Qiu, Jiangsu (CN)

(73) Assignee: Jiangsu Zhongheng Pet Supplies Co., Ltd., Jiangsu (CN)

( * ) Notice: Subject to any disclaimer, the term of this patent is extended or adjusted under 35 U.S.C. 154(b) by 0 days.

(21) Appl. No.: 14/278,284

(22) Filed: May 15, 2014

(65) Prior Publication Data

US 2014/0346293 A1 Nov. 27, 2014

(51) Int. Cl.
*A01K 5/00* (2006.01)
*A01K 7/00* (2006.01)
*A01K 5/01* (2006.01)

(52) U.S. Cl.
CPC ............... *A01K 7/00* (2013.01); *A01K 5/0114* (2013.01)

(58) Field of Classification Search
USPC ..................... 119/51.5, 61.5, 61.56
See application file for complete search history.

(56) References Cited

U.S. PATENT DOCUMENTS

| | | | | |
|---|---|---|---|---|
| 4,658,759 A * | 4/1987 | Brown | ........................ | 119/61.5 |
| 5,509,376 A * | 4/1996 | Tsengas | ...................... | 119/51.5 |
| D424,759 S * | 5/2000 | Sipka | ........................... | D30/130 |
| 6,145,474 A * | 11/2000 | Lemkin | ....................... | 119/61.5 |
| 7,341,019 B1 * | 3/2008 | Tsengas | ...................... | 119/61.5 |
| D592,814 S * | 5/2009 | Uffner et al. | ................. | D30/133 |
| 8,516,975 B2 * | 8/2013 | Becattini et al. | ........... | 119/61.54 |
| 2003/0106498 A1 * | 6/2003 | Mersits et al. | ................... | 119/61 |
| 2008/0190372 A1 * | 8/2008 | Horvath | ..................... | 119/61.56 |
| 2009/0199775 A1 * | 8/2009 | Shamoon | ................... | 119/61.56 |
| 2009/0241844 A1 * | 10/2009 | Becattini et al. | ............. | 119/51.5 |
| 2010/0107984 A1 * | 5/2010 | Uffner et al. | ................. | 119/61.5 |
| 2010/0162961 A1 * | 7/2010 | Hove et al. | ................... | 119/51.5 |

* cited by examiner

*Primary Examiner* — Bradley Duckworth
(74) *Attorney, Agent, or Firm* — Hauptman Ham, LLP

(57) ABSTRACT

A combined dish rack for feeding pets includes a main body and legs. The main body has two dish setting openings for positioning dishes. The main body and legs are detachably attached to each other. The main body on a bottom thereof has a plurality of protruding members. The legs have slots configured to receive the protruding members if the legs are attached to the main body. The legs are configured to be placed in a housing defined by a top wall and a side wall of the main body.

11 Claims, 2 Drawing Sheets

COMBINED DISH RACK

CROSS REFERENCE TO RELATED APPLICATION

The present application is based on, and claims priority from, Chinese Application Number 201320268730.0, filed May 23, 2013, the disclosure of which is incorporated herein in its entirety.

TECHNICAL FIELD

The present disclosure relates to a dish rack for pets, and specifically, a combined dish rack.

BACKGROUND

Pets are more and more important in people's lives; and the requirement for the pet's life quality is also more and more higher. When people feed the pets, for example, dogs and cats, food is usually placed in dishes, which are directly put on the floor. Due to the fact that pets usually stand while eating, there would be a certain distance between the pets and the food. Therefore, during the feeding process, the food may spill out of the dishes onto the floor, which increases people's workload of cleaning. Therefore, there are some improvements to the design of pet's feeding devices. Although certain progresses have been made, they all so far do not solve this problem.

BRIEF DESCRIPTION OF THE DRAWINGS

The present disclosure will be further described in conjunction with the drawing figures and embodiments.

DETAILED DESCRIPTION

One or more embodiments of a combined dish rake will be explained with reference to FIGS. 1, 2, 3 and 4.

Figure 1:
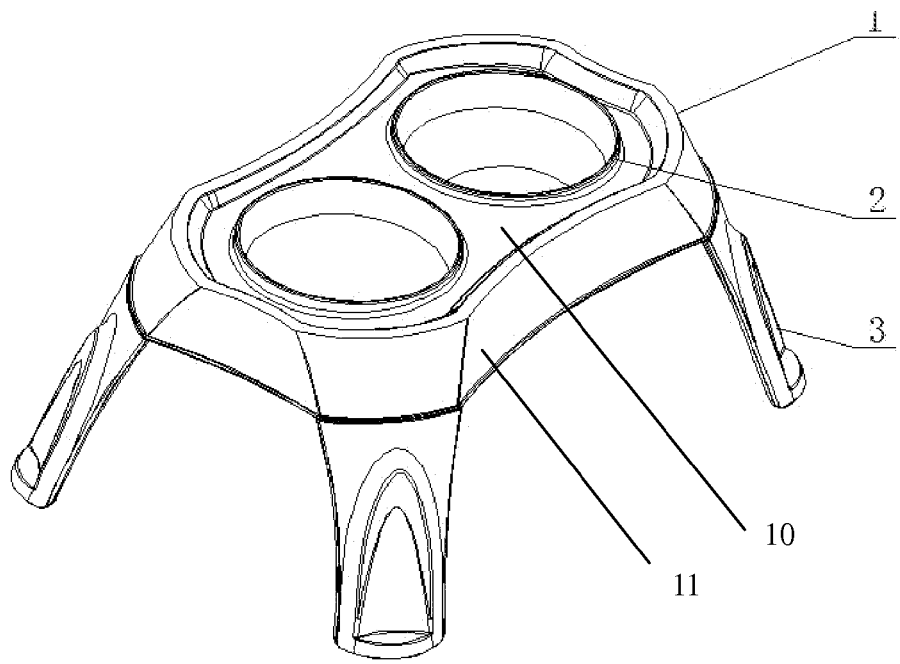
FIG. 1 is a schematic perspective view of an embodiment of a combined dish rack.

FIG. 1 shows a perspective view of the combined dish rack. The combined dish rack includes a main body 1 and legs 3 (only three legs being visible in FIG. 1) connected to the main body 1. The main body 1 of the dish rack includes a top wall 10 having the dish setting openings 2 and a side wall 11 integral with the top wall 10. In at least some embodiments, main body 1 is a parallelogram shape. In at least some embodiments, main body 1 is a parallelogram shape having concave side walls. The side wall 11 extends downward from a peripheral edge of the top wall 10. In at least some embodiments, side wall 11 extends downward at an angle from the peripheral edge of the top wall 10. The side wall 11 and top wall 10 define a housing for storing the legs 3 at the bottom of the main body after the legs 3 are detached from the main body 1.

Figure 4:
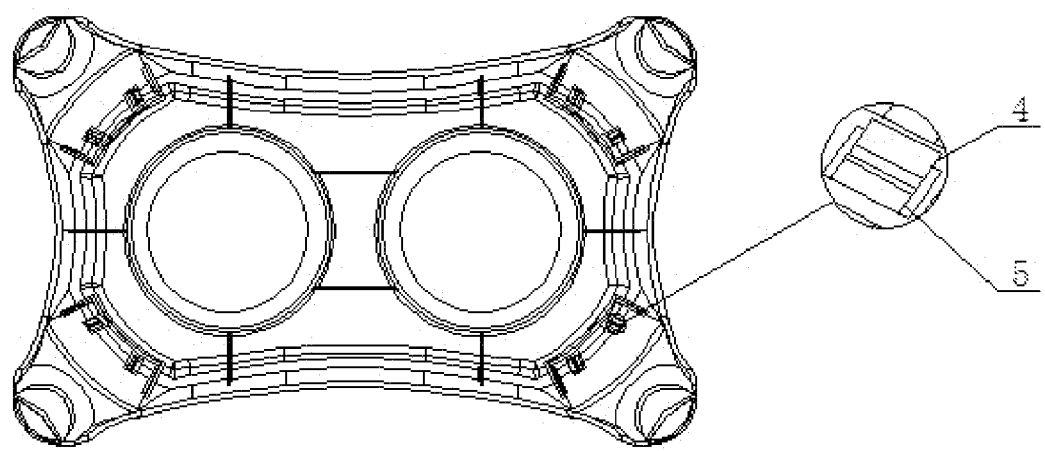
FIG. 4 is a schematic view of the embodiment of the combined dish rack in a packing state.

In the embodiment illustrated in FIG. 1, the combined dish rack includes a pair of dish setting openings 2 for positioning dishes (as shown in FIG. 4). The number of dish setting openings 2 is not limited to the embodiment of FIG. 1. In some embodiments, there are a greater or lesser number of dish setting openings 2. The main body 1 may be provided with more than two or only one dish setting opening to meet different needs from customers. In at least some embodiments, dish setting openings 2 are circular. In at least some other embodiments, each opening of dish setting openings 2 differs in shape from another opening of dish setting openings 2. In at least some other embodiments, dish setting openings 2 are other than circular shaped.

Figure 2:
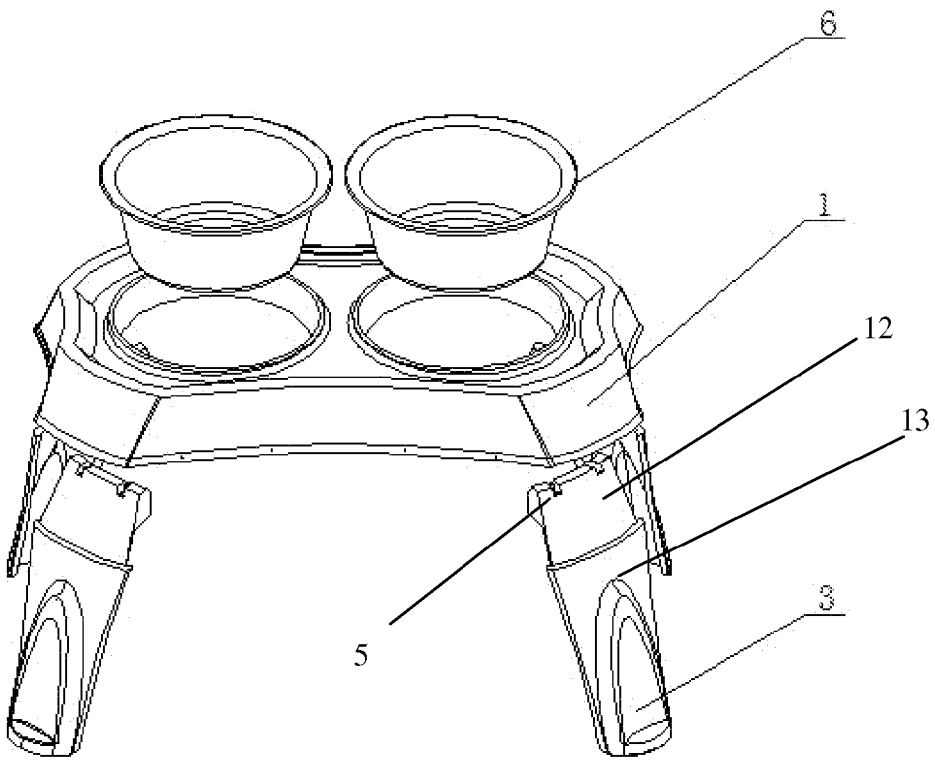
FIG. 2 is a schematic bottom view of the embodiment of the combined dish rack in a disassembled state where the rack legs are detached from the main body.

FIG. 2 shows the combined dish rack in a disassembled state where the legs 3 are detached from the main body 1. Specifically, each of the rack legs 3 has a stepped shape that includes a top member 12 and a bottom member 13. When the rack legs 3 are attached to the main body 1, the top members 12 are placed on an inner side of the side wall 11 and top surfaces of the bottom members 13 are in direct contact with bottom surfaces of the side wall 11, respectively. Further, the bottom member 13 of the leg 3 is flush with the side wall 11.

Figure 3:
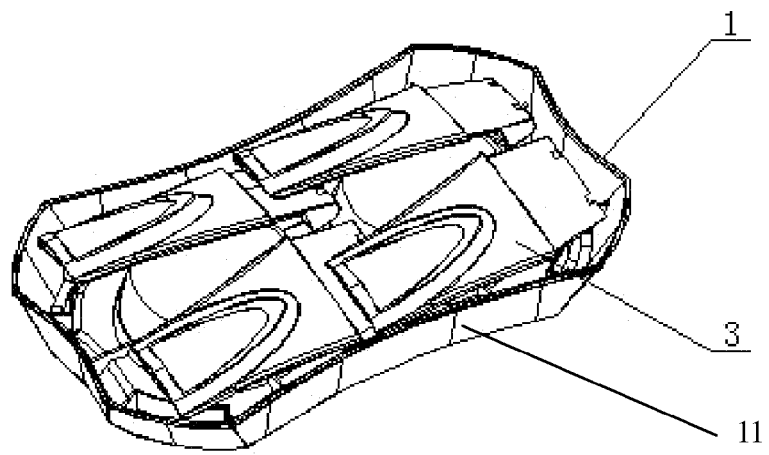
FIG. 3 is a schematic bottom view of the embodiment of the combined dish rack.

Further, the top members 12 of the rack legs 3 are provided with slots 5. As shown in FIGS. 2 and 3, each of the legs 3, on a top end thereof, has a pair of slots 5 for receiving the protruding members 4 provided at the bottom of the main body 1. The main body 1 is connected to the legs 3 by inserting the protruding members 4 into the slots 5. FIG. 3 further includes an enlarged view of one of the protruding members 4 inserted into the corresponding slot 5.

FIG. 3 shows a perspective view of the combined dish rack where the legs 3 are detached from the main body 1 and placed in the housing defined by the side wall 11 and the top wall 10. The legs 3 are individually placed in the housing. As shown in the embodiment of FIG. 3, a pair of legs 3 are positioned over another pair of legs 3. In particular, the bottom members 13 of the pair of legs 3 are placed on top of the top members 12 of the other pair of legs 3. The legs 3 are disposed adjacent to each other in a longitudinal direction of the main body 1 and in a transverse direction perpendicular to the longitudinal direction.

According to the embodiments of the combined dish rack, the protruding members 4 are provided at the bottom of the main body 1; and the slots 5 are provided on the legs 3. By fastening the respective protruding members 4 into the slots 5, the main body 1 for carrying the dishes 6 can be lifted up by the rack legs 3 so as to meet the requirements of pet feeding. When the combined dish rack is not in use or is in transportation, the legs 3 can be removed from the main body 1, and placed at the bottom of the main body 1. In this way, the volume of the combined dish rack is reduced to save storage space and to save the costs of production, storage and transportation.

One or more objects of one or more embodiments of the present disclosure is to provide a combined dish rack which helps pets to reach food easily and reduces the labor intensity of people's cleaning work.

According to one or more embodiments of the present disclosure, the combined dish rack includes a main body and legs attached to the top board. The legs can be disassembled and detached from the main body of the dish rack, then placed at the bottom of the main body. In this way, the volume of the dish rack is reduced to save storage space and to save the costs of production, storage and transportation.

According to one or more embodiments of the present disclosure, the main body of the combined dish rack includes dish setting openings for receiving dishes. In one or more embodiments of the present disclosure, the main body is provided with two dish setting openings.

According to one or more embodiments of the present disclosure, the main body of the combined dish rack is provided with a plurality of protruding members. The legs of the combined dish rack is provided with slots corresponding to the protruding members, on top ends of the legs. The main body is connected to the rack legs through the engagement between the protruding members and the slots.

One or more embodiments of the present application provide certain improvement and innovation to the conventional dish rack. The improvements include, but are not limited to, providing a plurality of protruding members at the bottom of the main body of the dish rack and slots on the legs. By fastening the protruding members in the corresponding slots, the main body is lifted up by the support of the legs such that the dishes for pet feeding can be positioned close to the pet during pet feeding. When the combined dish rack is not in use for feeding, the rack legs can be detached from the main body, and placed at the bottom of the main body.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A combined dish rack, comprising:
   a main body configured to carry dishes, said main body having a top wall and a side wall extending downward from a peripheral edge of the top wall; and
   legs detachably attachable to the main body, each of the legs having a top member and a bottom member connected with the top member,
   wherein
   the main body includes a plurality of protruding members,
   the legs include slots,
   the plurality of protruding members are engaged with the slots correspondingly if the legs are attached to the main body, and
   if the legs are detached from the main body, the top wall and the side wall define a housing for storing the legs, the legs are detached from the main body and placed individually in the housing, and one of the legs has the bottom member directly placed on the top member of another one of the legs.

2. The combined dish rack according to claim 1, wherein the top wall comprises a pair of openings for positioning dishes.

3. The combined dish rack according to claim 1, wherein each of the legs has a stepped shape.

4. The combined dish rack according to claim 3, wherein
   the top member is configured to be positioned on an inner side of the side wall, and
   a top surface of the bottom member is configured to be in direct contact with a lower surface of the side wall.

5. The combined dish rack according to claim 3, wherein the bottom member of the leg is flush with the side wall.

6. The combined dish rack according to claim 3, wherein each of the top member comprises at least one of the slots.

7. The combined dish rack according to claim 3, wherein the at least one slot is provided at a top end of the corresponding top member of the leg.

8. The combined dish rack according to claim 1, wherein the plurality of protruding members is disposed at a bottom of the main body.

9. The combined dish rack according to claim 1, wherein, if the legs are detached from the main body and placed individually in the housing, the top member of said one of the legs is not directly placed on the top member of said another one of the legs.

10. The combined dish rack according to claim 9, wherein, if the legs are detached from the main body and placed individually in the housing, said one of the legs is aligned with said another one of the legs in a length direction of the main body.

11. The combined dish rack according to claim 10, wherein
   the legs include a first pair of legs and a second pair of legs, and
   if the legs are detached from the main body and placed individually in the housing, the first pair of legs and the second pair of legs are located side by side in a width direction of the main body.

* * * * *